(12) United States Patent
Park et al.

(10) Patent No.: US 7,630,742 B2
(45) Date of Patent: Dec. 8, 2009

(54) LOCKER STRUCTURE OF BATTERY PACK FOR WIRELESS DEVICE

(75) Inventors: Jongho Park, Seoul (KR);
Byoung-Nam Kim, Seoul (KR);
Seunghyun Bang, Seoul (KR);
Sung-Dae Kim, Seoul (KR)

(73) Assignee: LG Chem, Ltd. (KR)

( * ) Notice: Subject to any disclaimer, the term of this patent is extended or adjusted under 35 U.S.C. 154(b) by 506 days.

(21) Appl. No.: 11/548,102

(22) Filed: Oct. 10, 2006

(65) Prior Publication Data
US 2007/0228741 A1      Oct. 4, 2007

(30) Foreign Application Priority Data
Nov. 23, 2005    (KR) .............. 10-2005-0112320

(51) Int. Cl.
*H04W 88/02* (2009.01)
*H04B 1/03* (2006.01)
*H04B 1/08* (2006.01)

(52) U.S. Cl. ............... 455/575.1; 455/90.3; 455/128; 455/348; 455/351

(58) Field of Classification Search ............ None
See application file for complete search history.

(56) References Cited
U.S. PATENT DOCUMENTS
4,943,498 A * 7/1990 Cooper et al. ........... 429/97
5,460,906 A * 10/1995 Leon et al. ............... 429/97
2003/0022633 A1 * 1/2003 Chen ........................ 455/90

FOREIGN PATENT DOCUMENTS
JP        2005-079019        3/2005

* cited by examiner

*Primary Examiner*—Philip J Sobutka
(74) *Attorney, Agent, or Firm*—Cantor Colburn LLP

(57) ABSTRACT

Disclosed herein is a wireless device including at least one locker structure. The locker structure includes a battery pack side coupling member (a first coupling member) protruding from the outer surface of a battery pack, the first coupling member having a hook formed at one side thereof and a structure tapered downward toward the battery pack (an incline structure) at the other side thereof, and a wireless device body side coupling member (a second coupling member) mounted in a body of the wireless device at the position corresponding to the first coupling member, the second coupling member including a coupling part which can be coupled with the hook, a member body having a rear protrusion formed at the position corresponding to the incline, and an elastic member mounted at the rear of the member body. When the member body is pushed toward the elastic member so as to separate the battery pack from the wireless device, the coupling part is uncoupled from the hook, and the rear protrusion pushes the incline of the first coupling member. As a result, the battery pack is automatically separated from the wireless device.

5 Claims, 2 Drawing Sheets

LOCKER STRUCTURE OF BATTERY PACK FOR WIRELESS DEVICE

FIELD OF THE INVENTION

The present invention relates to a battery pack locker structure for wireless devices, and, more particularly, to a wireless device including at least one locker structure, wherein the locker structure includes a battery pack side coupling member (a first coupling member) protruding from the outer surface of a battery pack, the first coupling member having a hook formed at one side thereof and a structure tapered downward toward the battery pack (an incline structure) at the other side thereof, and a wireless device body side coupling member (a second coupling member) mounted in a body of the wireless device at the position corresponding to the first coupling member, the second coupling member including a coupling part which can be coupled with the hook, a member body having a rear protrusion formed at the position corresponding to the incline, and an elastic member mounted at the rear of the member body, whereby, when the member body is pushed toward the elastic member so as to separate the battery pack from the wireless device, the coupling part is uncoupled from the hook, and the rear protrusion pushes the incline of the first coupling member with the result that the battery pack is automatically separated from the wireless device.

BACKGROUND OF THE INVENTION

Recently, wireless devices have been rapidly developed, which requires the use of a battery pack, which can be charged and discharged, as a power source for the wireless devices. Typical examples of the wireless devices may be a mobile phone, a personal digital assistant (PDA), a wireless game machine, a wireless sky wave receiver, a laptop computer, etc. The battery pack may have various specifications depending upon the structure or shape of the wireless devices.

For example, a laptop computer uses a battery pack having secondary batteries, which can be charged and discharged, mounted therein as a power source. The battery pack can be separated from the computer body of the laptop computer if necessary.

FIG. 1 is an enlarged view, in part, illustrating a laptop computer with such a battery pack, and FIG. 2 is a typical view illustrating a battery pack locker structure of the laptop computer.

Referring these drawings, a battery pack 1 is constructed such that the battery pack 1 can be mounted in a receiving part 3 provided at the rear bottom of a laptop computer 2. In order that the battery pack 1 can be attached to and detached from the laptop computer 2, a hook 4 protrudes from one side of the battery pack 1, and a locker 5 is mounted in the laptop computer 2 at the position corresponding to the hook 4. At the rear of the locker 5 is mounted a compression spring 6. The upper end of the hook is inclined toward the locker 5, and the front end of the locker 5 is inclined toward the hook 4. Consequently, when a user pushes the battery pack 1 in a direction indicated by a dotted line such that the hook 4 is inserted into an opening 7 of the laptop computer 2, the upper end of the hook 4 pushes the front end of the locker 5. As a result, the locker 5 is moved backward to press the compression spring 6. When the hook 4 is completely inserted into the opening 7, the locker 5 is moved forward by the restoring force of the compression spring 6. As a result, the locker 5 is coupled with the hook 4. In this way, the battery pack 1 is mounted to the laptop computer 2.

When the battery pack 1 is to be separated from the laptop computer 2, on the other hand, the user pushes a switch 8 connected to the locker and exposed from the outer surface of the laptop computer 2 in a direction indicated by an arrow a such that the locker 5 is moved backward toward the compression spring 6. As a result, the locker 5 is uncoupled from the hook 4. While this separation state is maintained, the user pushes the battery pack 1 in a direction indicated by an arrow b. As a result, the battery pack 1 is separated from the laptop computer 2.

Specifically, when the battery pack 1 is to be separated from the laptop computer 2, it is necessary that the user push the locker 5 toward the compression spring 6 using one hand, and, at the same time, the user push the battery pack 1 outward from the laptop computer 2 using the other hand. Generally, two locker structures are provided at opposite sides of the battery pack and the laptop computer in a symmetrical fashion. Consequently, it is necessary that the user push switches 8 using the thumbs of both hands, and, at the same time, the user push the battery pack 1 outward from the laptop computer 2 using the other fingers of the both hands.

As can be clearly understood from the above description, when the battery pack is to be separated from the laptop computer using the conventional locker structure, it is difficult to separate the battery pack from the laptop computer. Furthermore, the laptop computer or the battery pack may fall to the ground during the separation of the battery pack from the laptop computer.

A large number of measures to solve this problem have been proposed. For example, Japanese Unexamined Patent Publication No. 2005-79019 discloses a locker structure comprising a groove formed in a battery pack and a rod mounted in an electronic device and having a twisting spring such that the rod can be freely rotated at one side of a body of the electronic device, wherein the rod corresponding to the groove of the battery pack is rotated in the rotating direction of the spring such that the battery pack is separated from the electronic device. However, this locker structure has problems in that a large area is necessary to rotate the locker structure such that the battery pack can be separated from the electronic device, and the rotating operation and the separating operation are separately carried out.

Consequently, a technology for fundamentally solving the above-mentioned problems in connection with processes for mounting and separating a battery pack to and from a general wireless device, including a laptop computer, is highly required.

SUMMARY OF THE INVENTION

Therefore, the present invention has been made to solve the above problems, and other technical problems that have yet to be resolved.

Specifically, it is an object of the present invention to provide a wireless device having a locker structure that is capable of easily separating a battery pack from the wireless device through only a single operation of a user.

In accordance with the present invention, the above and other objects can be accomplished by the provision of a wireless device including at least one locker structure, wherein the locker structure comprises: a battery pack side coupling member (a first coupling member) protruding from the outer surface of a battery pack, the first coupling member having a hook formed at one side thereof and a structure tapered downward toward the battery pack (an incline structure) at the other side thereof; and a wireless device body side coupling member (a second coupling member) mounted in a body of the wireless device at the position corresponding to the first coupling member, the second coupling member including a coupling part which can be coupled with the hook, a member body having a rear protrusion formed at the position corresponding to the incline, and an elastic member mounted at the rear of the member body, whereby, when the member body is pushed toward the elastic member so as to separate the battery pack from the wireless device, the coupling part is uncoupled from the hook, and the rear protrusion pushes the incline of the first coupling member with the result that the battery pack is automatically separated from the wireless device.

According to the present invention, a process of mounting the battery pack to the wireless device can be easily performed based on the same principle as in FIG. 2. Furthermore, a process of separating the battery pack from the wireless device can be easily performed through only a single operation to push the member body of the second coupling member toward the elastic member.

The wireless device of the present invention is a concept including a mobile phone, a personal digital assistant (PDA), a wireless game machine, a wireless sky wave receiver, a laptop computer, etc. Preferably, the wireless device is a laptop computer.

Preferably, the locker structure comprises a pair of locker structures located at the contact region between the battery pack and the wireless device body. In this case, the member bodies of the second coupling members are moved toward each other when the member bodies of the second coupling members are moved toward the elastic members so as to separate the battery pack from the wireless device. The locker structures may be constructed such that the right-side member body is moved toward the corresponding elastic member in the left direction, and the left-side member body is moved toward the corresponding elastic member in the right direction.

In a preferred embodiment, the member body of the second coupling member includes a plurality of grooves formed therein so as to prevent the slippage of a user's finger when the user moves the second coupling member from side to side, an extension extending from the lower end of the member body at the side opposite to the side where the elastic member is mounted, and a protrusion vertically extending upward from the end of the extension. Specifically, the second coupling member is constructed such that the member body and the protrusion are disposed vertically at the opposite sides about the horizontal extension, and therefore, a space defined by left, right, and lower sides is formed. The first coupling member is received in the space.

The coupling part is a structure protruding from the upper end of a specific region, where the extension is formed, of the member body of the second coupling member. The coupling part is formed in the shape of a jaw, to which the hook is coupled when the hook is inserted into the space of the second coupling member.

Also, the coupling part is constructed such that the front end of the coupling part is tapered downward toward the hook of the first coupling member. Consequently, when the first coupling member is coupled with the second coupling member, the coupling part serves to press the elastic member together with the hook, which is tapered upward. Specifically, when the first coupling member is moved downward such that the first coupling member is coupled to the second coupling member, the tapered surfaces (inclines) of the hook and the coupling part slide while being coupled with each other.

Consequently, it is possible to move (backward) the second coupling member toward the elastic member even with a small force.

Preferably, the elastic member is a compression spring, which serves to control the side-to-side movement of the second coupling member. Specifically, the compression spring elastically pushes the second coupling member toward the hook of the first coupling member, thereby accomplishing the coupling of the battery pack to the wireless device.

Preferably, the rear protrusion has a curved end, which is brought into contact with the incline of the first coupling member when the battery pack is separated from the wireless device. The reason why the rear protrusion has the curved end is to maximize the sliding effect of the first coupling member due to the incline thereof and to minimize the damage to the incline when the first coupling member is brought into contact with the end of the rear protrusion.

Preferably, the incline of the first coupling member is at an angle of 30 to 60 degrees to a plane parallel with the coupling direction of the first coupling member, whereby the sliding effect of the first coupling member is further improved, and therefore, the battery pack is separated from the wireless device even when a small force is applied to the second coupling member.

BRIEF DESCRIPTION OF THE DRAWINGS

The above and other objects, features and other advantages of the present invention will be more clearly understood from the following detailed description taken in conjunction with the accompanying drawings, in which.

Figure 1:
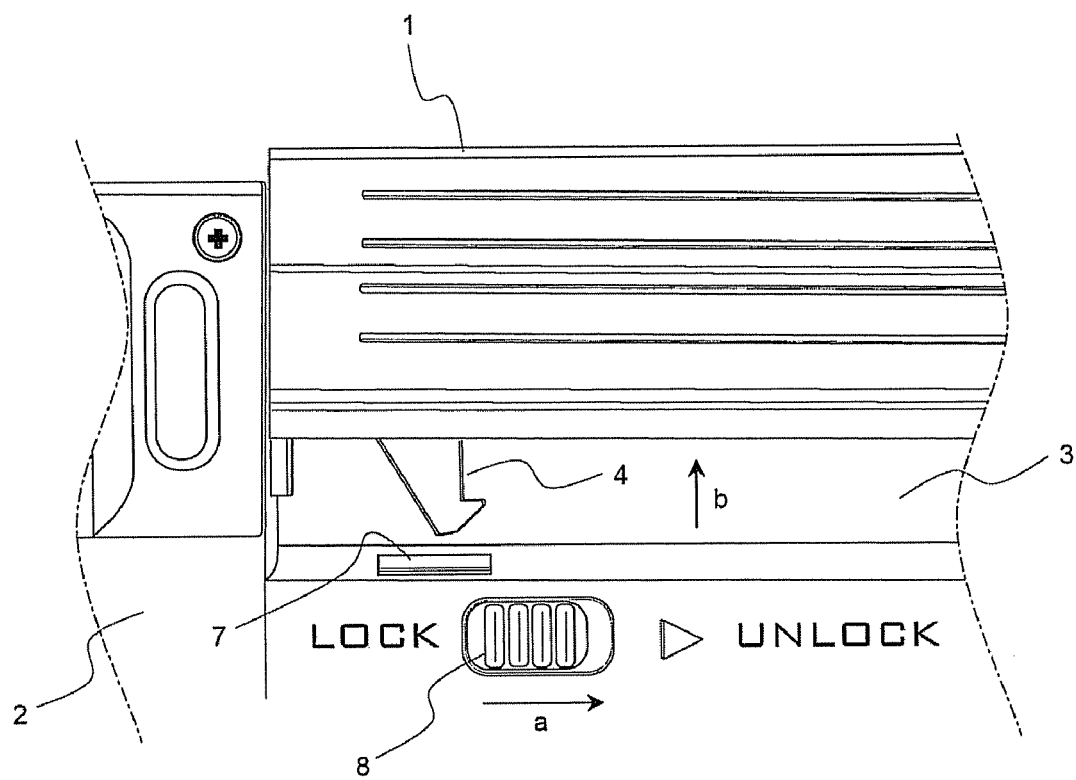
FIG. 1 is an enlarged view, in part, illustrating a conventional laptop computer with a battery pack.

<Description of Main Reference Numerals of the Drawings>

| | |
|---|---|
| 10: first coupling member | 20: second coupling member |
| 101: hook | 102: incline |
| 204: elastic member | 206: rear protrusion |
| 207: coupling part | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
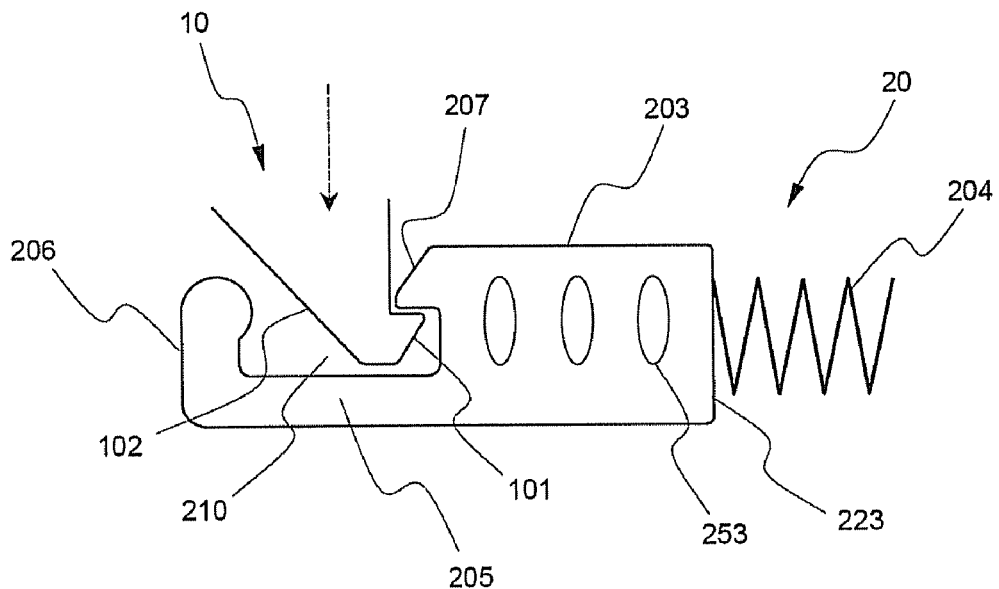
FIG. 3 is a typical view illustrating a battery pack locker structure according to a preferred embodiment of the present invention.

FIG. 3 is a typical view illustrating a battery pack locker structure according to a preferred embodiment of the present invention.

Figure 2:
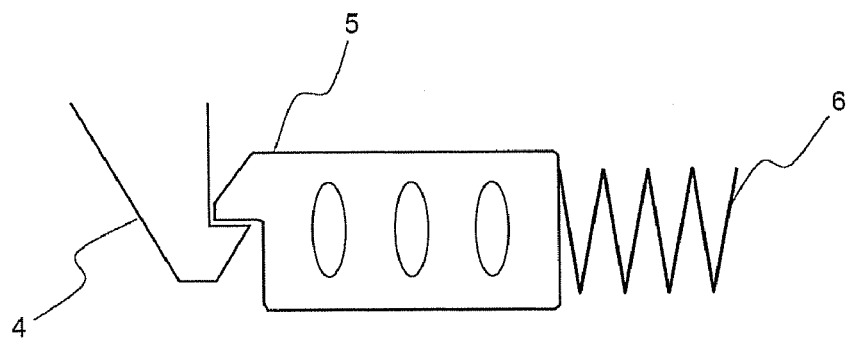
FIG. 2 is a typical view illustrating a battery pack locker structure of the laptop computer shown in FIG. 1.

Referring to FIG. 3, the locker structure comprises a first coupling member 10 formed at a battery pack (not shown) and a second coupling member 20 mounted in a wireless device, for example, a laptop computer (not shown), which is similar to the locker structure as shown in FIG. 2.

The first coupling member 10 is provided at one side with a hook 101. The first coupling member is provided at the other side with an incline 102, which is tapered downward toward the battery pack. The second coupling member 20 includes a member body 203 which can be coupled with the hook 101 of the first coupling member 20, a compression spring 204 mounted at the rear of the member body 203, and a rear protrusion 206 extending from an extension 205 and formed at the position corresponding to the incline 102 of the first coupling member 10.

At the member body 203 of the second coupling member 20 are formed a plurality of grooves 253 to prevent the slippage of a user's finger when the user moves the second coupling member 20 from side to side.

The extension 205 is formed along the lower end of the member body 203, to which the compression spring is mounted. The rear protrusion 206 vertically extends upward from the end of the extension 205 at the side opposite to the side where the compression spring 204 is mounted. Consequently, the member body 203 and the rear protrusion 206 are disposed vertically at the opposite sides about the extension 205 with the result that a receiving space 210 for receiving the first coupling member is formed.

From one end of the member body 203 protrudes a coupling part 207, which is coupled with the hook 101 of the first coupling member 10. Consequently, the coupling part 207 is coupled with the hook 101 of the first coupling member 10 when the hook 101 of the first coupling member 10 is inserted into the receiving space 210.

The coupling between the coupling part 207 and the hook 101 is stably maintained by the compression spring 204 pushing a rear end 223 of the member body 203.

Figure 4:
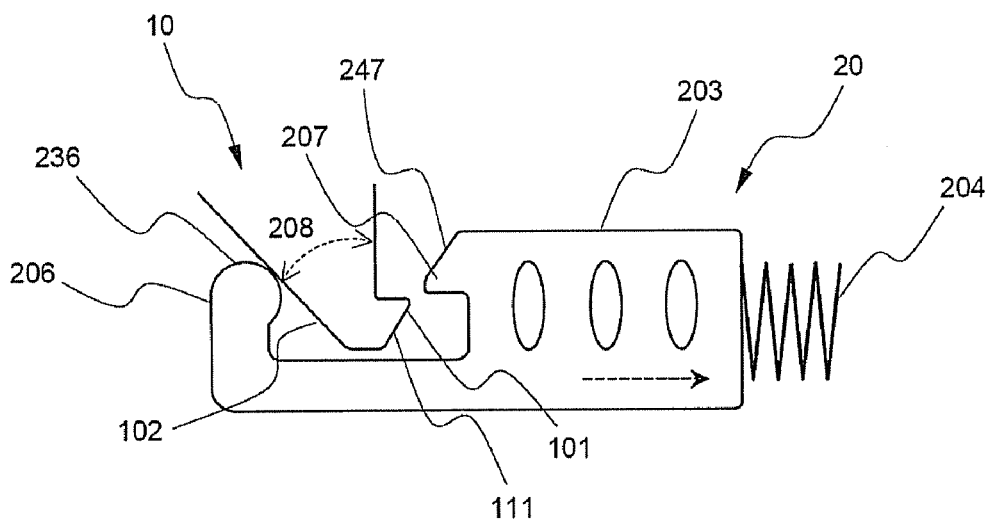
FIG. 4 is a typical view illustrating separation of a battery pack from a laptop computer by the locker structure shown in FIG. 3.

FIG. 4 is a typical view illustrating separation of a battery pack from a laptop computer, which is an example of wireless device, by the locker structure shown in FIG. 3.

Referring to FIG. 4, when the member body 203 of the second coupling member 20 is pushed toward the compression spring 204, the coupling part 207 is uncoupled from the hook 101, and the rear protrusion 206 pushes the incline 102 of the first coupling member 10. As a result, the battery pack (not shown) is automatically separated from the laptop computer.

An end 236 of the rear protrusion 206 is formed in a curved shape so as to maximize the sliding effect of the incline 102 and to minimize the damage to the incline 102 when the end 236 of the rear protrusion 206 is brought into contact with the incline 102 of the first coupling member 10.

When an angle 208 of the incline 102 is between 30 and 60 degrees, the sliding effect of the incline 102 is further improved, and therefore, it is possible to easily move the second coupling member even with a small force and thus to easily separate the battery pack from the laptop computer. More preferably, the angle 208 of the incline 102 is approximately 45 degrees.

The incline 111 of the hook 101 is tapered upward toward the coupling part 207. An incline 247 of the coupling part 207 is tapered downward toward the hook 101. When the battery pack is mounted to the laptop computer, i.e., when the first coupling member 10 is moved downward such that the first coupling member 10 is coupled with the second coupling member 20, the inclines 111 and 247 slide while being coupled with each other. Consequently, it is possible to easily press the compression spring 204, and therefore, to move the second coupling member, even with a small force.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery pack locker structure for wireless devices according to the present invention has the effect of easily separating a battery pack from a wireless device, for example, a laptop computer, through only a single operation of a user.

What is claimed is:

1. A wireless device including at least one locker structure, wherein the locker structure comprises:
   a battery pack side coupling member (a first coupling member) protruding from the outer surface of a battery pack, the first coupling member having a hook formed at one side thereof and a structure tapered downward toward the battery pack (an incline structure) at the other side thereof; and
   a wireless device body side coupling member (a second coupling member) mounted in a body of the wireless device at the position corresponding to the first coupling member, the second coupling member including a coupling part which can be coupled with the hook, a member body having a rear protrusion formed at the position corresponding to the incline, and an elastic member mounted at the rear of the member body, whereby
   when the member body is pushed toward the elastic member so as to separate the battery pack from the wireless device, the coupling part is uncoupled from the hook, and the rear protrusion pushes the incline of the first coupling member with the result that the battery pack is automatically separated from the wireless device,
   wherein the rear protrusion has a curved end, which is brought into contact with the incline of the first coupling member when the battery pack is separated from the wireless device, and the elastic member is a compression spring.

2. The wireless device according to claim 1, wherein the wireless device is a mobile phone, a personal digital assistant (PDA), a wireless game machine, a wireless sky wave receiver, or a laptop computer.

3. The wireless device according to claim 2, wherein the wireless device is a laptop computer.

4. The wireless device according to claim 1, wherein the locker structure comprises a pair of locker structures located at the contact region between the battery pack and the wireless device body.

5. The wireless device according to claim 1, wherein the incline is inclined at an angle of 30 to 60 degrees.

* * * * *

UNITED STATES PATENT AND TRADEMARK OFFICE
CERTIFICATE OF CORRECTION

PATENT NO. : 7,630,742 B2
APPLICATION NO. : 11/548102
DATED : December 8, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Second Day of November, 2010

David J. Kappos
*Director of the United States Patent and Trademark Office*